US011657083B2

United States Patent
Christensen et al.

(10) Patent No.: US 11,657,083 B2
(45) Date of Patent: May 23, 2023

(54) IMAGE LOCATION BASED ON PERCEIVED INTEREST

(71) Applicant: Micron Technology, Inc., Boise, ID (US)

(72) Inventors: Carla L. Christensen, Boise, ID (US); Bhumika Chhabra, Boise, ID (US); Zahra Hosseinimakarem, Boise, ID (US); Radhika Viswanathan, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 16/996,823

(22) Filed: Aug. 18, 2020

(65) Prior Publication Data

US 2022/0058218 A1    Feb. 24, 2022

(51) Int. Cl.
*G06F 16/538* (2019.01)
*G06F 16/54* (2019.01)
*G06F 16/583* (2019.01)
*G06F 16/535* (2019.01)
*G06F 9/451* (2018.01)

(52) U.S. Cl.
CPC ........... *G06F 16/538* (2019.01); *G06F 9/451* (2018.02); *G06F 16/535* (2019.01); *G06F 16/54* (2019.01); *G06F 16/583* (2019.01)

(58) Field of Classification Search
CPC .... G06F 16/538; G06F 16/583; G06F 16/535; G06F 16/54; G06F 9/451
USPC ........................................................ 707/734
See application file for complete search history.

(56) References Cited

U.S. PATENT DOCUMENTS

| | | | |
|---|---|---|---|
| 10,025,861 B2 * | 7/2018 | Yi | G06F 16/9535 |
| 10,395,762 B1 * | 8/2019 | Fram | G16H 30/40 |
| 2012/0117473 A1 * | 5/2012 | Han | G06F 3/0483 715/723 |
| 2015/0205493 A1 * | 7/2015 | Kritt | H04L 51/32 715/731 |
| 2017/0017397 A1 * | 1/2017 | Morley | G06F 3/067 |
| 2017/0344900 A1 * | 11/2017 | Alzahrani | G06F 16/48 |
| 2019/0149879 A1 * | 5/2019 | Siddiq | H04N 21/4667 725/14 |
| 2019/0155382 A1 * | 5/2019 | Ikuta | H04N 5/64 |
| 2020/0244716 A1 | 7/2020 | Mehta et al. | |
| 2020/0257302 A1 | 8/2020 | Bozchalooi | |
| 2020/0257943 A1 | 8/2020 | Huber et al. | |

(Continued)

*Primary Examiner* — Kimberly L Wilson
(74) *Attorney, Agent, or Firm* — Brooks, Cameron & Huebsch, PLLC (57) ABSTRACT

Methods, apparatuses, and non-transitory machine-readable media for image location based on a perceived interest are described. Apparatuses can include a display, a memory device, and a controller. In an example, the controller can assign a perceived interest and sort images based in part on the perceived interest. In another example, a method can include the assigning, by a controller coupled to a memory device, a perceived interest of an image of a plurality of images, wherein the perceived interest is assigned based in part on a period of time the image is visible on a display coupled to the memory device, selecting the image from an initial viewing location responsive to the assigned perceived interest; and transferring the image to a different viewing location, wherein the initial viewing location and the different viewing location are visible on the display.

21 Claims, 8 Drawing Sheets

(56) References Cited

U.S. PATENT DOCUMENTS

2020/0258313 A1    8/2020  Chen et al.
2020/0260048 A1    8/2020  Merg et al.
2021/0350160 A1*  11/2021  Chapman ................ G06T 11/20

* cited by examiner

IMAGE LOCATION BASED ON PERCEIVED INTEREST

TECHNICAL FIELD

The present disclosure relates generally to apparatuses, non-transitory machine-readable media, and methods for image location based on perceived interest.

BACKGROUND

Images can be viewed on computing devices. A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can include a display used to view images and/or text. The display can be a touchscreen display that serves as an input device. When a touchscreen display is touched by a finger, digital pen (e.g., stylus), or other input mechanism, associated data can be received by the computing device. The touchscreen display may include pictures and/or words, among others that a user can touch to interact with the device.

DETAILED DESCRIPTION

Apparatuses, machine-readable media, and methods related to image location based on perceived interest are described. Computing device displays (e.g., monitors, mobile device screens, laptop screens, etc.) can be used to view images (e.g., static images, video images, and/or text) on the display. A user of a computing device may prefer some images over other images and sort those images to various viewing locations on a display. Images can be organized by the computing device for the convenience of the user. For instance, a computing device can include a controller and a memory device to organize the images based on a preference of the user. The preference can be based on a perceived interest of the image by the user. In an example, a method can include assigning, by a controller coupled to a memory device, a perceived interest of an image of a plurality of images, wherein the perceived interest is assigned based in part on a period of time the image is visible on a display coupled to the memory device, selecting the image from an initial viewing location responsive to the assigned perceived interest; and transferring the image to a different viewing location, wherein the initial viewing location and the different viewing location are visible on the display.

As used herein, the term "viewing location" refers to a location that can be visible on the display of a computing device. The display can be part of a user interface for a computing device, where the user interface allows the user to receive information from the computing device and provide inputs to the computing device. The viewing location can be selected by a user of the computing device. For example, a user can select a viewing location visible on the display to view the images allocated to the viewing location. The images allocated to a particular viewing location can share a common perceived interest.

As used herein, the term "perceived interest" refers to a level of importance an image is determined to possess. For instance, a perceived interest of an image may be an assignment corresponding to a user's subjective interest in the image. For example, a user may use a computing device such as a mobile device (e.g., a smart phone) equipped with an image sensor (e.g., a camera) to generate an image. In other examples, a computing device can receive (or otherwise obtain) an image from the internet, a screenshot, an email, a text message, or other transmission. In other examples, a computing device can receive an image from the internet, an email, a text message, or other transmission. Additionally, a computing device can generate groups of images based on criteria in an attempt to associate a perceived interest in the grouped images.

Computing devices can group images without requiring the input of a user. For example, some approaches to generating groups of images with a perceived interest to the user of the computing device include grouping images by a geographical location in which they were generated, grouping by facial recognition (e.g., grouping images according to who/what is included in the image), and/or a time (e.g., a time of day, month, year, and/or season). However, the images that are grouped by a computing device using location, facial recognition, and/or time can be inaccurate and fail to capture a user's subjective perception of interest in an image. For example, the grouped images may not represent what the user subjectively (e.g., actually) perceives as interesting, but instead can group repetitive, poor quality, disinteresting, or otherwise undesired images. The inaccurate grouping of images can result in cluttered image viewing locations on a display of a computing device and result in situations where the user is frequently searching for a particular image. This may result in frustration, wasted time, resources, and computing power (e.g., battery life).

Examples of the present disclosures can ease frustration, clutter, conserve resources and/or computing power by grouping images together that share a perceived interest of the user. For example, a perceived interest can be assigned to an image generated, received, and/or otherwise obtained by a computing device (e.g., the camera of a smart phone) based on a period of time that the image is visible on the display of the computing device. Said differently, if a user locates the image such that it is visible on the display frequently and/or for a period of time (e.g., a configurable predetermined period of time), it may be assigned a perceived interest. Images with a shared perceived interest can be made available to the user on the display such that at a user can easily find images frequently sought. In other embodiments, undesired images generated by the computing device can be identified and be made available on the display such that a user can review and discard the images, thus removing clutter.

For example, images generated by the computing device that are not visible on the display for a period of time and/or infrequently reviewed or searched by a user, may be assigned a perceived interest (e.g., a lack of perceived interest) corresponding to an undesired preference and moved to a viewing location such that a user can review and discard the images. Said differently, sometimes users can capture, receive, and/or otherwise obtain images on a computing device (e.g., a smart phone) that may not necessarily be important to the user, repetitive, etc. These infrequently viewed images can be grouped together and the computing device can prompt the user to discard the images.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 222 can reference element "22" in FIG. 2, and a similar element can be referenced as 322 in FIG. 3. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
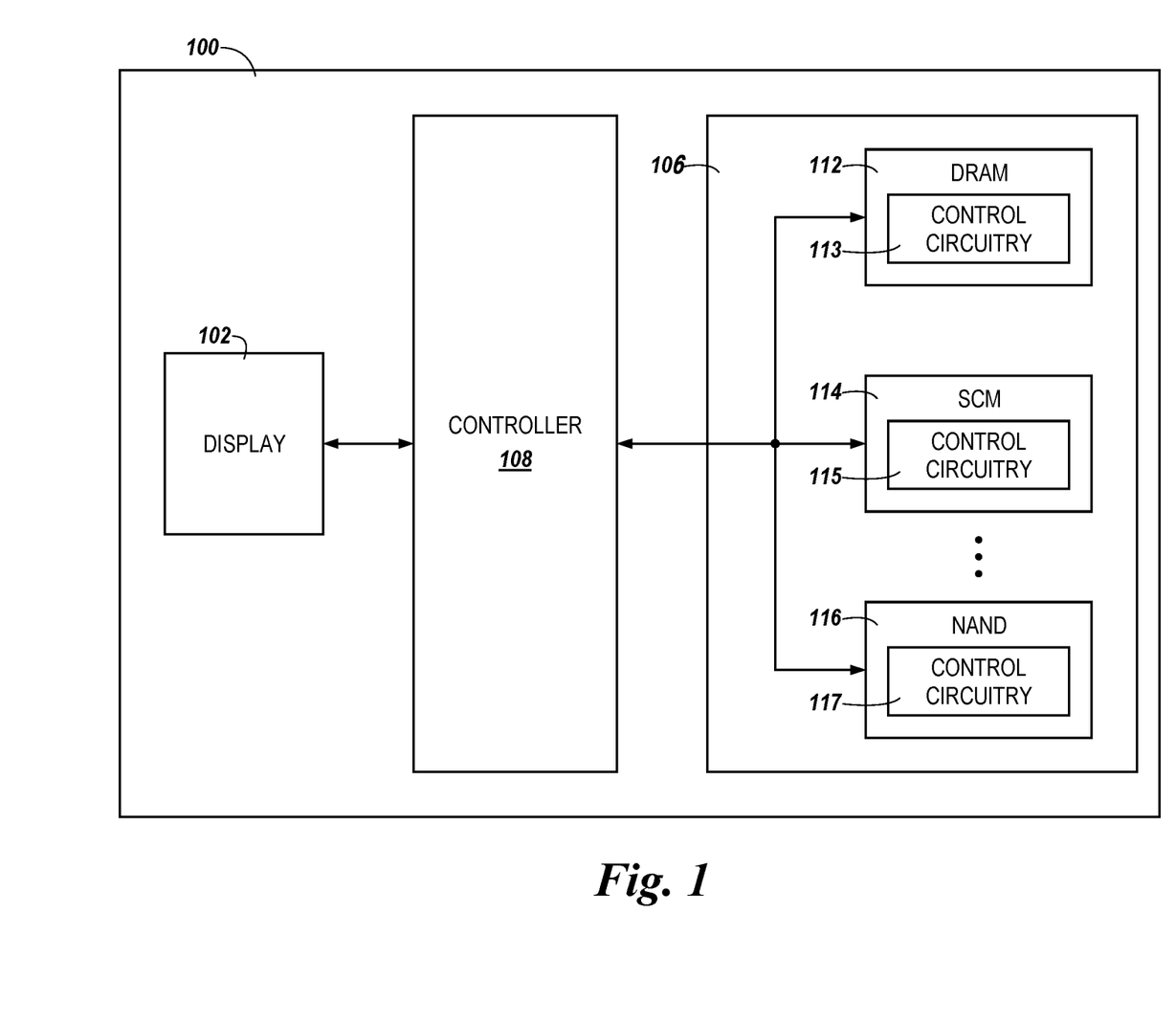
FIG. 1 is a functional block diagram in the form of an apparatus having a display, a memory device, and a controller in accordance with a number of embodiments of the present disclosure.

FIG. 1 is a functional block diagram in the form of a computing system including an apparatus 100 having a display 102, a memory device 106, and a controller 108 (e.g., a processor, control circuitry, hardware, firmware, and/or software) in accordance with a number of embodiments of the present disclosure. The memory device 106, in some embodiments, can include a non-transitory machine-readable medium (MRM), and/or can be analogous to the memory device 792 described with respect to FIG. 7.

The apparatus 100 can be a computing device, for instance, the display 102 may be a touchscreen display of a mobile device such as a smartphone. The controller 108 can be communicatively coupled to the memory device 106 and/or the display 102. As used herein, "communicatively coupled" can include coupled via various wired and/or wireless connections between devices such that data can be transferred in various directions between the devices. The coupling need not be a direct connection, and in some examples, can be an indirect connection.

The memory device 106 can include non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random access memory (SRAM), among others.

In other embodiments, as illustrated in FIG. 1, the memory device 106 can include one or more memory media types. FIG. 1 illustrates a non-limiting example of multiple memory media types in the form of a DRAM 112 including control circuitry 113, SCM 114 including control circuitry 115, and a NAND 116 including control circuitry 117. While three memory media types (e.g., DRAM 112, SCM 114, and NAND 116) are illustrated, embodiments are not so limited, however, and there can be more or less than three memory media types. Further, the types of memory media are not limited to the three specifically illustrated (e.g., DRAM 112, SCM 114, and/or NAND 116) in FIG. 1, other types of volatile and/or non-volatile memory media types are contemplated. In a number of embodiments, the controller 108, the memory media DRAM 112, SCM, 114, and/or NAND 116, can be physically located on a single die or within a single package, (e.g., a managed memory application). Also, in a number of embodiments, a plurality of memory media (e.g., DRAM 112, SCM, 114, and NAND 116), can be included on a single memory device.

A computing device can include an image sensor (e.g., a camera) to generate images which can be visible on the display 102. For example, the display 102 can be a portion of a mobile device including a camera (e.g., a smart phone). The images generated by an image sensor can be written (e.g., stored) on the memory device 106. The controller 108 can present the images on the display 102 responsive to a selection made by a user on the display 102. For instance, a user may select via a menu (e.g., a "settings" menu, a "images" or "pictures" menu, etc.) displayed on the display 102 to show images available to view on the display 102. Such a menu may give the user options as to what images the user wants to view and/or the user can manually select and customize images into groups. For example, a user may make a group of images that the user selects as a "favorite image" and other "favorite images" can be grouped together to create albums which can be labeled as a user desires.

Manually selecting images as a "favorite image" can be tedious, and, as mentioned above, grouping the images without user input (e.g., by geographic location, facial recognition, etc.) can be inaccurate and include repetitive images that are undesired, thus leaving the user to still manually search and select a desired image. As previously mentioned, the apparatus 100 can be a computing device and include a memory device 106 coupled to the display 102 via the controller 108. To group images to viewing locations on the display based on a perceived interest, the controller 108 can be configured to determine a period of time an image of a plurality of images is visible on a display. The controller 108 can determine a period of time that an image has been visible on the display 102. For example, a user may be scrolling through a plurality of images and stop at a particular image for a period of time, such that the particular image is visible on the display for the period of time. The controller 108 can determine the period of time the particular image is visible on the display 108 and correlate it to a perceived interest.

The controller 108 can assign a perceived interest to the particular image based on the determined period of time. The particular image can be assigned a perceived interest by the controller 108 based on the period of time the particular image is visible on the display 102. Likewise, other images that have not been selected but scrolled over by the user can be assigned a perceived interest that corresponds to a lack of interest. The controller 108 can transfer the particular image to a particular viewing location on the display. As used herein, the term "transfer" refers to moving and/or creating a copy of an image and moving it from a first viewing location to a different viewing location. In some examples, respective viewing locations can include other images that share common perceptions of interest.

For example, the controller 108 can transfer the particular image from an initial viewing location on the display 102 to a different viewing location on the display 102 responsive to the assigned perceived interest. The controller 108 can transfer the particular image from a default viewing location on the display 102 to a different viewing location on the display 102. In some examples the different viewing location can include other images that have been previously identified as images with a perceived interest. In other examples, the controller 108 can transfer images with a different perceived interest (e.g., have not been selected, visible on the display, etc.) and transfer them to a viewing location on the display 102 such that a user can review them to be discarded.

In an example embodiment, the controller 108 can be coupled to a plurality of memory media types (e.g., DRAM 112, SCM 114, and/or NAND 116), where the images included in an initial viewing location can be written in a first memory media type (e.g., DRAM 112) and images included in the different viewing location can be written in a second memory media type (e.g., NAND 116). For example, the different viewing location on the display 102 may include images that are written to a memory media type that is more secure and/or more suitable for long term storage on the computing device. As such, the viewing locations written to the respective memory media types (e.g., DRAM 112, SCM 114, and/or NAND 116) can include other images that have been selected by the controller 108 based on a respective perceived interest.

Figure 2:
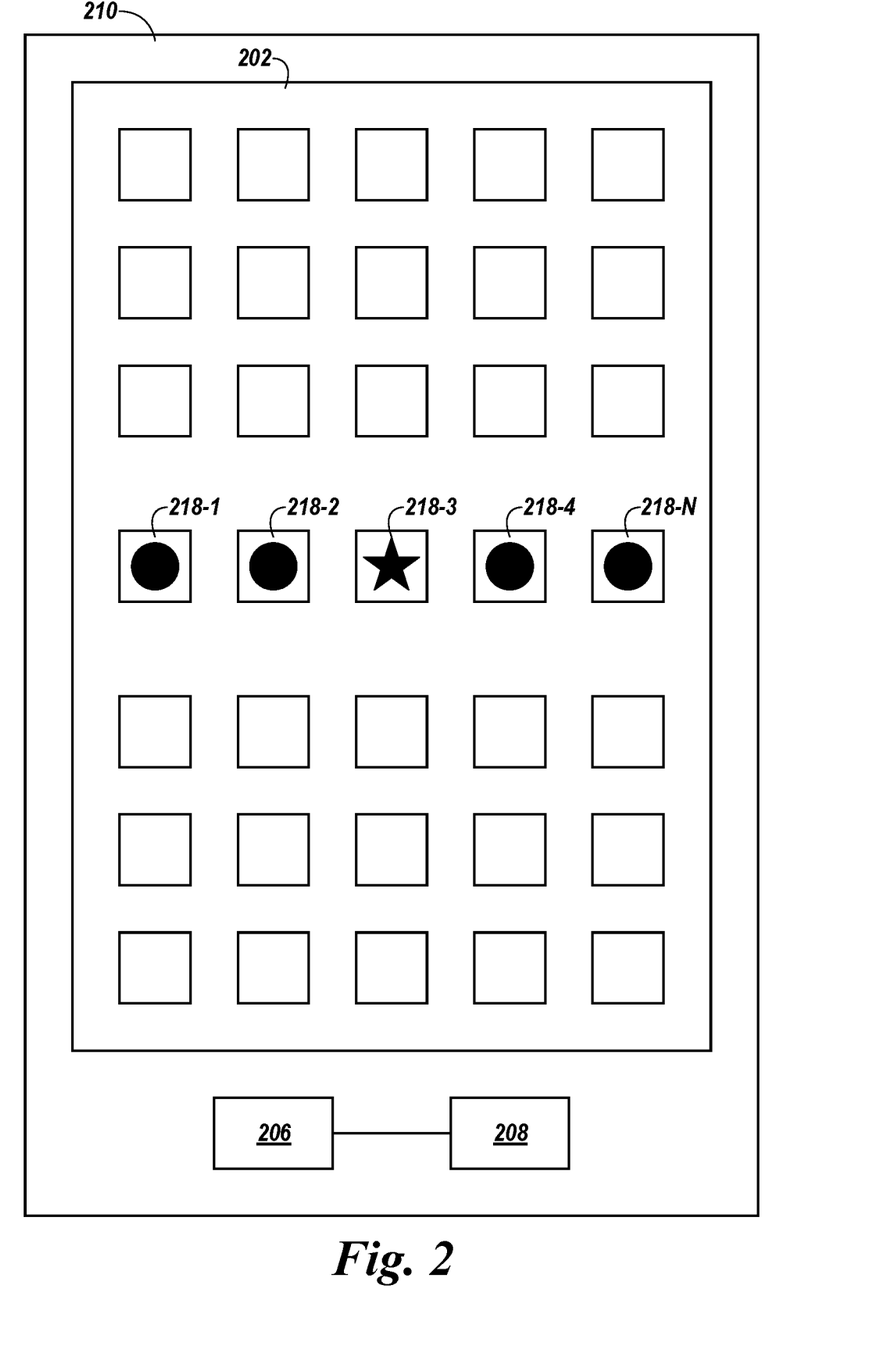
FIG. 2 is a diagram representing an example of a computing device including a display with visible images in accordance with a number of embodiments of the present disclosure.
Figure 3A:
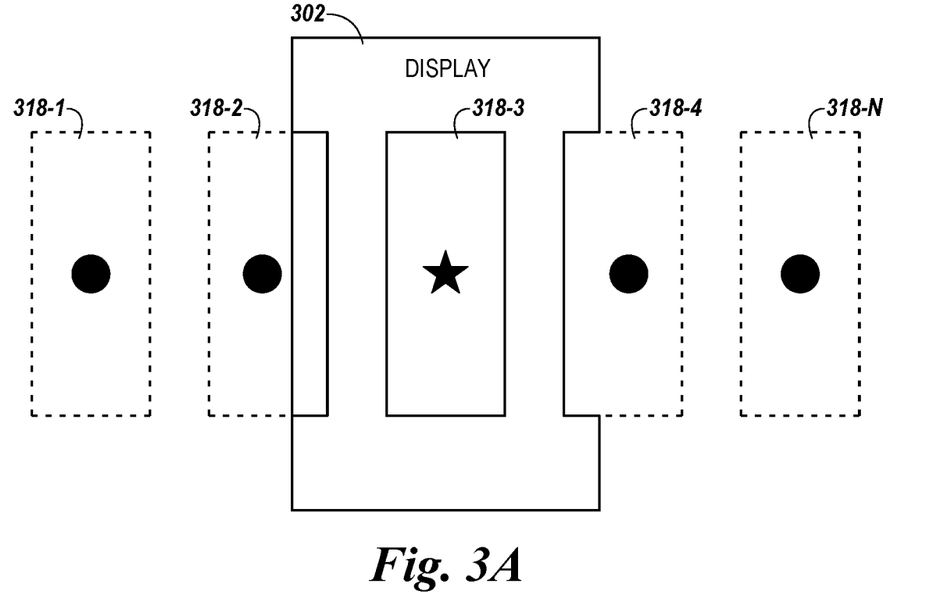
FIGS. 3A-3E are diagrams representing an example display including visible and non-visible images in accordance with a number of embodiments of the present disclosure.

FIG. 2 is a diagram representing an example of a computing device 210 including a display 202 with visible images 218 in accordance with a number of embodiments of the present disclosure. FIG. 2 illustrates a computing device 210 such as a mobile device including a display 202. The computing device 210 further includes a memory device 206, which is analogous to the memory device 106 of FIG. 1. The memory device 206 can be coupled to a controller 208 which can be analogous to the controller 108 of FIG. 1. FIG. 2 illustrates the display 202 as including a plurality of images 218-1, 218-2, 218-3, 218-4, and 218-N which can be referred to herein as images 218.

FIG. 2 illustrates a non-limiting example of a particular image 218-3 denoted with a star and other images 218-1, 218-2, 218-4, and 218-N which are denoted with a circle. The other squares illustrated in the display 202 are analogous to images 218 but are unmarked here as to not obscure examples of the disclosure.

The display 202 includes a plurality of images 218. In some examples, the plurality of images 218 may be included in an initial viewing location on the display 202 and presented in chronological order. Said differently, the plurality of images 218 can be images that are presented to a user in the order in which that have been generated by an image sensor (e.g., a camera) and/or received, transmitted, or otherwise obtained by the computing device 210. A user can use an appendage (e.g., a finger) or a device (e.g., a stylus, a digital pen, etc.) to select one or more images 218-1, 218-2, 218-3, 218-4, 218-N from the plurality of images 218. The selection of a particular image 218-3 rather than other images 218-1, 218-2, 218-4, and/or 218-N can indicate a perceived interest corresponding to a desired preference of the user.

The controller 208 can use multiple methods to assign a perceived interest to an image 218. For example, the controller 206 can assign a perceived interest based on a selection of a particular image 218-3 such that the image 218-3 is visible on the display for a period of time. When the particular image 218-3 is selected, it can be enlarged such that is encompasses all or a majority of the display 202 as will be described in connection with FIGS. 3A-3E. The period of time can be configured as a user configurable setting. For example, a user can configure the computing device 210 (e.g., the controller 208) to assign a perceived interest to an image (e.g., image 218-3) corresponding to a desired preference of the user when it is selected from a group of images 218 to be visible on the display for period of time five seconds or longer. While five seconds is used as an example herein, the period of time can be shorter or longer than five seconds. The computing device 210 can store metadata, including a metadata value, associated with the image that can indicate the perceived interest of the image, the location of the image on the display, a grouping of the image, among other information that can be included in the metadata associated with an image. The elimination of the requirement of a user to manually denote an image as a "favorite image" can reduce clutter and frustration of the user experience of the computing device 210.

In another non-limiting example, the controller 208 can assign a perceived interest to an image 218 when an image 218 is modified or otherwise altered. For example, the controller 208 can assign a perceived interest to a particular image 218-3 when the image is selected and edited. An edit can include a modification to an image such as cropping the image, applying a filter to the image, etc.

In another non-limiting example, the controller 208 can assign a perceived interest to an image 218 based on a quantity of search events. A search event can include a user searching for an image using a key word, spoken phrase, etc. A search event can also include scrolling or swiping through images 218 to locate a particular image 218-3. For example, a search event can include an image 218-3 of the plurality of images 218 being visible on the display for a period of time prior to progressing to another image. Said differently, a search event of image 218-3 can include a user scrolling through image 218-1, image 218-2, pausing at image 218-3 for a period of time, and scrolling on to image 218-4 and image 218-N. Another example of a search event can include a user scrolling past the particular image 218-3 and then returning to the particular image 218-3 (discussed with reference to FIGS. 3A-3E). A search event can also include, instead of continuing to scroll and/or swipe to another image after pausing for the period of time at image 218-3, the controller 208 can switch to another application (e.g., opening email, browsing the web, etc.).

In some examples, a perceived interest can be assigned to images 218 that have not been selected or otherwise been made visible on the display 202 for the period of time. For example, assume the images 218-1, 218-2, 218-4, and 218-N have not been selected by the controller 208, they may be assigned a perceived interest that that corresponds to an image that is undesired by the user. In this example, the images with a perceived interest that reflects a disinterest by the user can be sorted and transferred to a viewing location on the display 202. In some examples, this viewing location may be used to prompt the user to discard these images to ease clutter and memory space on the memory device 206.

In some embodiments, the controller 208 can change a perceived interest for an image 218. For example, an image 218-1 can be assigned a perceived interest that that corresponds to an undesired preference to a user of the computing device 210. Subsequently, responsive to the image 218-1 being selected and/or edited, the controller 208 can assign a new perceived interest to represent an image that is desired by the user. In this example, the controller 208 can transfer and/or copy the image to a viewing location on the display 202 that represents images that are desirable to the user. Said differently, the controller 208 can be configured to edit an image 208-1 of the plurality of images 218, and change the perceived interest of the particular image, where the perceived interest is based in part on the edit made to the image 218-1.

The controller 208 can sort the plurality of images 218 based on the assigned perceived interest. This can be done without user input (e.g., upon setting up the computing device the controller 208 can be configured with user preferences) or a user may select a prompt asking if this is a preference. For instance, upon loading the application, the controller 208 determines that the user may want to include a perceived interest in particular images and may prompt the user for affirmation. Alternatively, the controller 208 can determine that the user may want to include a perceived interest that corresponds to an undesired preference to a user to images 218 that have not been selected for a particular period of time and may prompt the user to discard the images.

In some embodiments, the controller 208 can assign a perceived interest to each of the plurality of images 218 and sort the plurality of images 218 based on the assigned perceived interest. The controller 208 can select a subset of the plurality of images 218 with a perceived interest above or below a threshold and prompt the computing device 210 to display the subset of the plurality of images in the different viewing location on the display 202. For example, images that have infrequently been visible on the display 202 for a period of time (e.g., have not been selected, viewed, or searched for) may be below a threshold of perceived interest and images that are often viewed and/or searched for can be above a threshold of perceived interest. Said differently, the controller 208 can determine a threshold of perceived interest and sort the images 218 into multiple viewing location on the display 202 according to the assigned perceived interest.

FIGS. 3A-3E are diagrams representing an example display including visible and non-visible images 318 in accordance with a number of embodiments of the present disclosure. FIGS. 3A-3E each illustrate a display 302 which is analogous to the displays 102 and 202 of FIGS. 1 and 2. The display 302 may be part of a computing device (e.g., the computing device 210 of FIG. 2) and be coupled to a controller (e.g., the controller 208 of FIG. 2) and a memory device (e.g., the memory device 206 of FIG. 2). FIGS. 3A-3E each include images 318-1 to 318-N, which are analogous to images 218 of FIG. 2 and can be referred herein as images 318. The images 318 can have be illustrated with a solid line, a broken line, or a combination of both a solid line and broken line. The solid line indicates a portion, or the entirety of the image 318 is visible on the display, a broken line indicates the entirety of the image 318 or a portion of the image is not visible on the display 302. For example, FIG. 3A illustrates image 318-2 as partially visible on the display 302 and image 318-3 is completely visible and centered on the display 302.

FIG. 3A illustrates an example of an image 318-3 that has been selected from a plurality of images 318. When the image 318-3 is selected, it may be centered on the display 302. In some examples (not pictured), the only image visible is the selected image 318-3. In other examples, as illustrated by FIGS. 3A-3E, the selected image 318-3 may be centered on the display 302 and prior image 318-2 and subsequent image 318-4 can be partially visible on the display 302. A controller coupled to the display 302 can be configured with an amount of time (e.g., a threshold amount of time) that an image 318 would need to be visible to assign a perceived interest that corresponds to an image that is desired by a user.

For example, as illustrated in FIG. 3A, if the threshold is a period of time of five seconds, the controller can determine if the selected image 318-3 is visible on the display 302 for five seconds or longer. If so, the controller can assign a perceived interest corresponding to a user preference for the image 318-3. In contrast, if the image 318-3 is not visible on the display for the threshold period of time of five seconds, the controller can assign a perceived interest that corresponds to a user's undesired preference (e.g., an indifference) to the image 318-3. In some examples, the controller can assign a perceived interest based on search events for an image.

For example, a controller can be configured to include a threshold quantity of search events. For example, the controller can determine a quantity of times an image has been sought. In some examples, a search event can include a user scrolling through pictures on the display 302 and passing the image he or she is looking for (e.g., image 318-3), and returning to the desired image 318-3. This concept is illustrated by FIGS. 3A, 3B, 3C, 3D, and 3E.

Figure 3B:
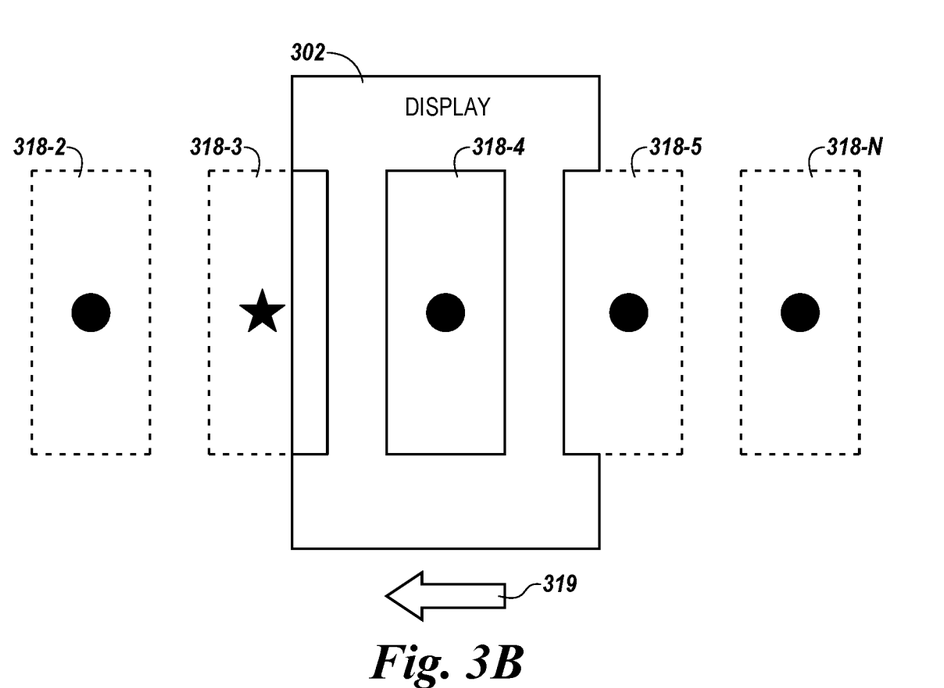
Figure 3C:
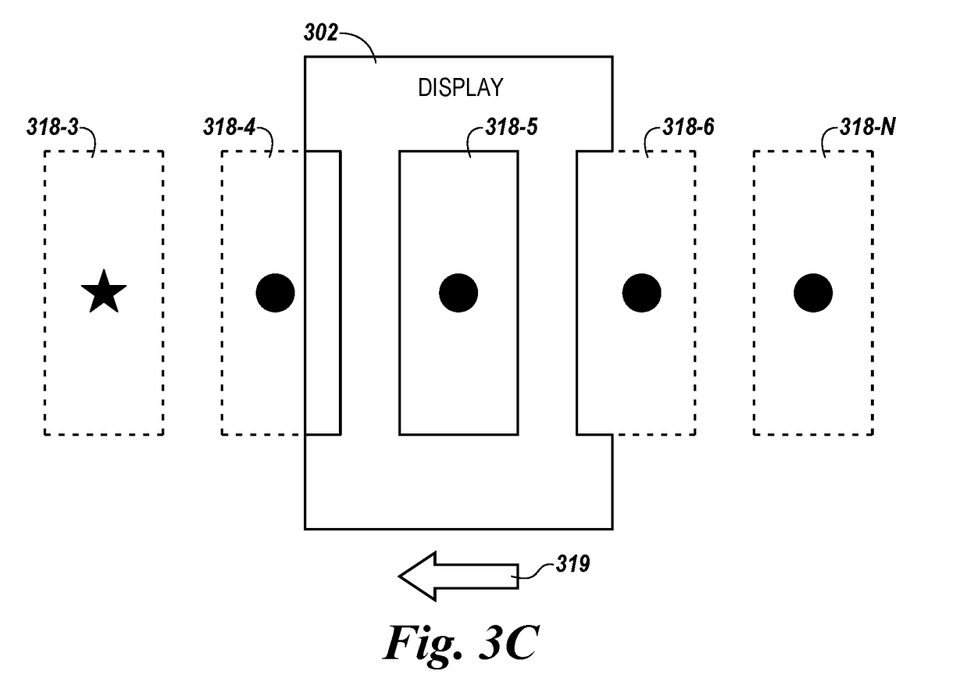
Figure 3D:
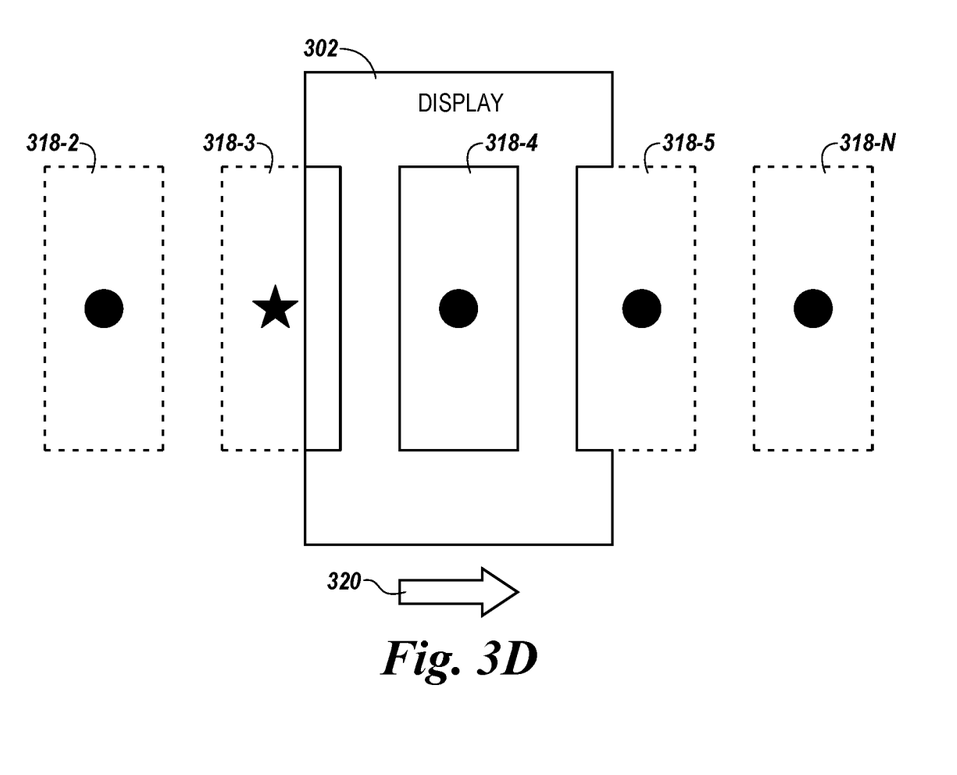
Figure 3E:
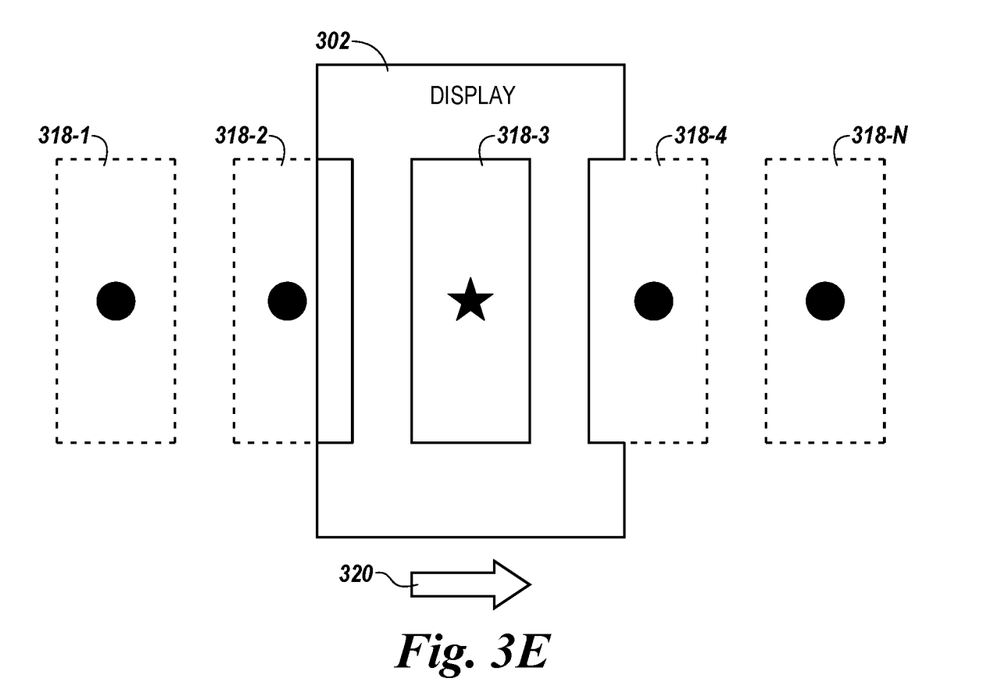

In a non-limiting example, a perceived interest corresponding to a preference to an image can be assigned based in part on, within a period of time: the image being visible on the display prior to a different image being visible on the display; and subsequently returning to the image being visible on the display. For example, as denoted by the arrow 319, FIG. 3B illustrates the progression of images to the left of the page, past the particular image 318-3 such that image 318-4 is centered on the display 302. As denoted by the arrow 319, FIG. 3C illustrates the progression of images to the left of the page, further past the image 318-3 such that image 318-5 is centered on the display 302. As denoted by the arrow 320, FIG. 3D illustrates the progression of images to the right of the page, such that image 318-4 is centered on the display 302. As denoted by the arrow 320, FIG. 3E illustrates the progression of images to the right of the page, returning to the particular image 318-3 such that image 318-3 is centered on the display 302. The controller can assign a perceived interest based in part on a search even such as illustrated by FIGS. 3A-3E. Said differently, a search event can include, within a period of time, a particular image 318-3 being visible two or more times, wherein at least one different image is visible between the two or more times.

In some examples, the images 318-1 to 318-N are stored in an initial viewing location in chronological order and a search event includes reverting from a subsequent image and/or a prior image (e.g., 318-1, 318-2, 318-4, 318-5, . . . 318-N) to the particular image 318-3 within a period of time while viewing the plurality of images in the initial viewing locations. In other words, within a configured period of time a user can scroll past the desired image 318-3 and then revert back to the desired image 318-3, the controller can use this event as a search event and assign a perceived interest to the image 318-3 that can correspond to the user preferring that image.

Additionally, or instead of, the controller can utilize a quantity of search events to assign a perceived interest to the images. The controller can be configurable to assign a perceived interest corresponding to a preference to an image when it has been searched for three or more times. While the number three is used herein for purposes of an example, the number can be more or less than 3. For instance, if an image 318-3 experiences a single search event, the controller can refrain from assigning a perceived interest corresponding to a preference for the image 318-3. However, if the image experiences a total of three or more search events, the controller can assign a perceived interest corresponding to a preference for the image 318-3. This image 318-3 can be transferred to a viewing location on the display for images that are preferred.

In another example embodiment, the controller can be configurable to assign a perceived interest corresponding to an undesired preference (e.g., an indifference) of an image when it has been searched for two or fewer times. While the number two is used herein for example purposes, the number can be more or less than two. For instance, if an image 318-1 has experienced only one search event, or has been only visible on the display once, the controller can assign a perceived interest corresponding to an indifference to the user. This image 318-1 can be transferred to a viewing location on the display intended to be reviewed to be discarded.

Figure 4A:
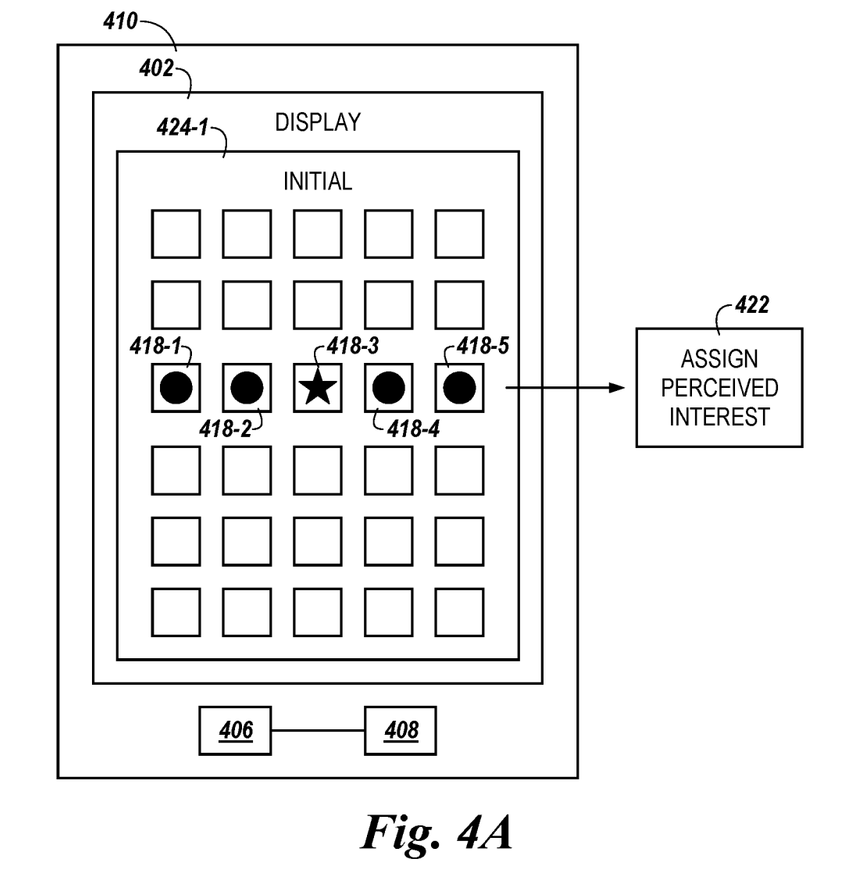
FIGS. 4A-4B are functional diagrams representing computing devices for image location on a display based on perceived interest in accordance with a number of embodiments of the present disclosure.
Figure 4B:
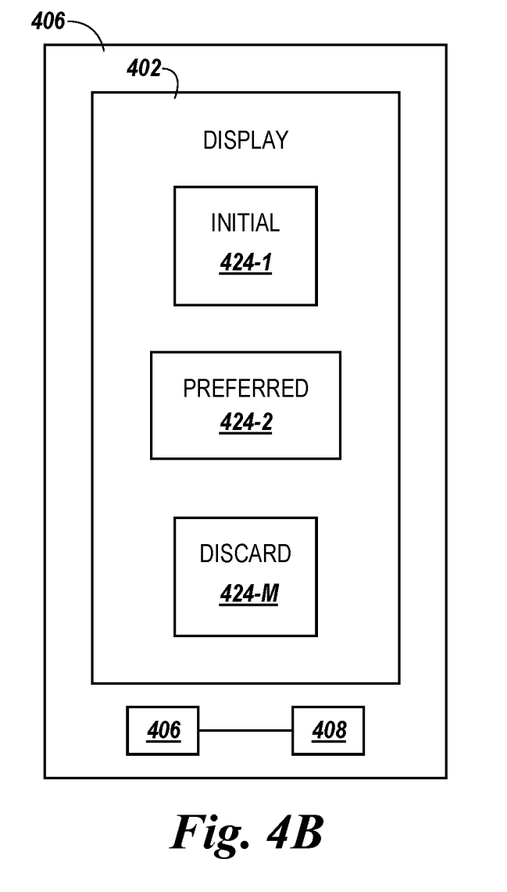

FIGS. 4A-4B are functional diagrams representing computing devices 410 for image location on a display 402 based on perceived interest in accordance with a number of embodiments of the present disclosure. FIGS. 4A and 4B each illustrate a display 402 which is analogous to the displays 102, 202, and 302 of FIGS. 1, 2, and 3 and images 418-1 to 418-N, which are analogous to images 218 and 318 of FIGS. 2 and 3 and can be referred herein as images 418. The display 402 may be part of a computing device 410 and analogous to the computing device 210 of FIG. 2 and coupled to a controller 408 which is analogous to the controllers 108 and 208 of FIGS. 1 and 2 and a memory device analogous to the memory devices 106 and 206 of FIGS. 1 and 2.

FIG. 4B illustrates image viewing location visible on the display 402. The initial viewing location 424-1 can include each of the plurality of images 418. The images 418 can be viewable in the initial viewing location 424-1 in chronological order and/or be the default image viewing location for images generated, received, or otherwise obtained by the computing device 410. A second viewing location can be the preferred image viewing location 424-2 the images viewable here can include images that have been assigned (by the controller 408) a perceived interest corresponding to a desired preference of the user. The discard viewing location 424-M can include images that have been assigned (by the controller 408) a perceived interest corresponding to an undesired preference to the user. The images 418 may be grouped and transferred to a viewing location on the display 402 based at least in part on the perceived interest assigned by the controller 408. The images 418 of FIG. 4A can be the contents of the initial viewing location 424-1 as illustrated.

The controller 408 at box 422 can assign a perceived interest to each of the images 418. The controller 408 can group the plurality of images based on the perceived interest. The controller 408 can be further configured to determine the perceived interest that was assigned to each of the plurality of images 418 and sort the plurality of images 418 based on the assigned perceived interest. Images that are determined to have a perceived interest that corresponds to a desired preference can be stored in the preferred viewing location 424-2 illustrated in FIG. 4B. For example, the controller 408 can transfer a subset of images with a perceived interest corresponding to a desired preference to a different viewing location (e.g., the preferred viewing location 424-2), where the subset of image(s) (e.g., 418-3) are identified responsive to sorting the plurality of images based on the assigned perceived interest at box 422 of FIG. 4A. In this example, the different viewing location is presented on the display 402 as a folder (e.g., the preferred viewing location 424-2) indicating the perceived interest.

In another example, the images 418 that are determined to have a perceived interest that corresponds to an undesired preference (e.g., an indifference by the user) can be stored in the discard viewing location 424-M illustrated in FIG. 4B. For instance, the controller 408 can transfer a subset of images (e.g., 418-1, 418-2, 418-4, and 418-N) with a perceived interest corresponding to an undesired preference to a different viewing location (e.g., the discard viewing location 424-M), where the subset of images (e.g., 418-1, 418-2, 418-4, and 418-N) are identified responsive to sorting the plurality of images based on the assigned perceived interest. In this example, the different viewing location is presented on the display 402 as a folder (e.g., the discard viewing location 424-M) of a suggested collection of images of the plurality of images to be discarded.

Figure 5:
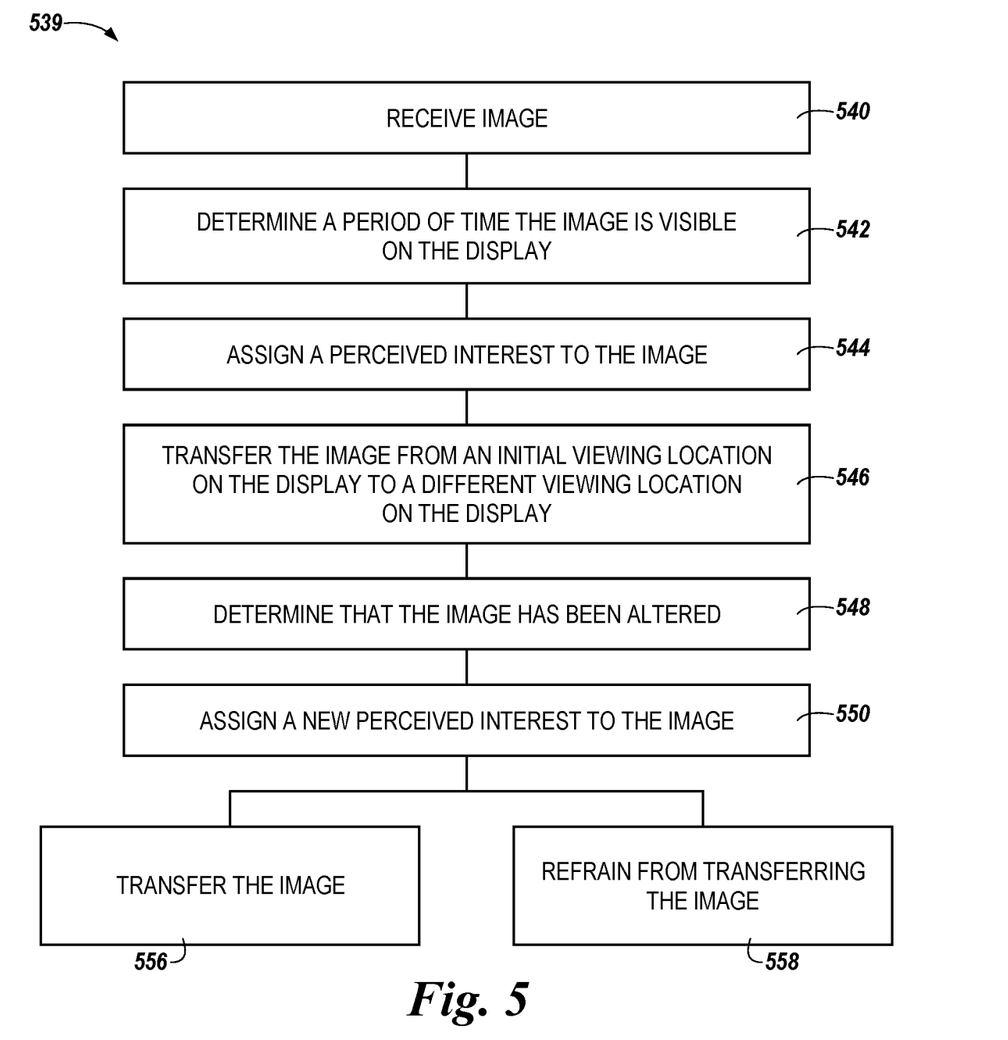
FIG. 5 is a block diagram for an example of image location based on perceived interest in accordance with a number of embodiments of the present disclosure.

FIG. 5 is a block diagram 539 for an example of image location based on perceived interest in accordance with a number of embodiments of the present disclosure. FIG. 5 describes a computing device (e.g., the computing device 410 of FIG. 4) which is equipped with a camera to generate images and a controller (e.g., the controller 108 of FIG. 1) to receive, transmit, or otherwise obtain images. At box 540 the computing device can generate an image and the controller can receive the image. The image can be saved to an initial viewing location (e.g., the initial viewing location 424-1 of FIG. 4B). At box 542, the controller can determine an amount of time that the image is visible on a display (e.g., the display 102 of FIG. 1). At box 544, the controller can assign a perceived interest to the image. For example, the perceived interest can be assigned by determining a quantity of search events, if the image has been edited, and/or if the image has been visible for an amount of time greater or less than a threshold amount of time, or a combination thereof.

For instance, the controller may be configured with a threshold amount of time (e.g., five seconds) or a threshold of search events (e.g., 2 search events). An image being above the threshold corresponds to a desired preference of the image and an image being below the threshold corresponds to an undesired preference. At block 546, the controller can transfer the image from the initial viewing location on the display to a different viewing location (e.g., the preferred viewing location 424-2 or the discard viewing location 424-M of FIG. 4) on the display. Said differently, the controller can display the image of the plurality of images on the computing device as a suggested preferred group based on the perceived interest being above the threshold. As mentioned, if the assigned perceived interest is below a threshold the controller can displaying the image of the plurality of images on the computing device as a suggested discard group based on the perceived interest being below the threshold.

In some example embodiments, at block 548 the controller can determine that the image has been altered. As mentioned herein, an image being altered or edited (e.g., applying a filter, cropping, combining with another image, etc.) can indicate a perceived interest that corresponds to a desired preference. The controller can be configured to edit the image by selecting the image from a different viewing location (e.g., preferred viewing location 424-2 or discard viewing location 424-M) and at block 550, assign a new perceived interest to the image. The controller can be configured to transfer the image at block 556 from a different viewing location to a new viewing location (e.g., from the discard viewing location to the preferred viewing location and/or a new viewing location), or at block 558, refrain from transferring the image (e.g., the image can remain in the preferred viewing location). While a "preferred viewing location" a "discard viewing location" and an "initial viewing location" are discussed, there could be additional and/or different viewing location such as "edit viewing location" frequently emailed or texted viewing location" etc.

Figure 6:
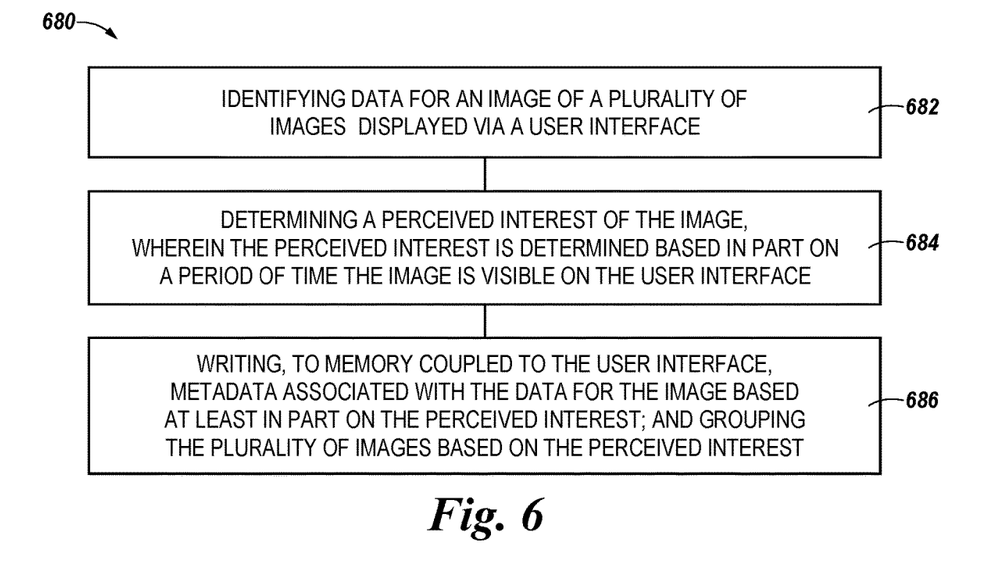
FIG. 6 is flow diagram representing an example method for image location based on perceived interest in accordance with a number of embodiments of the present disclosure.

FIG. 6 is flow diagram representing an example method 680 for image location based on perceived interest in accordance with a number of embodiments of the present disclosure. At 682, the method 680 includes identifying data for an image of a plurality of images displayed via a user interface. The method can include assigning, by a controller coupled to a memory device, a perceived interest of an image of a plurality of images, wherein the perceived interest is assigned based in part on a period of time the image is visible on a display coupled to the memory device. The controller may be coupled to a computing device such as a mobile device with a touch screen display. The controller can assign the perceived interest based on search events, if an image has been edited, a duration the image is visible on the display, a quantity of times the image has been selected and/or sought, whether the image has been texted or emailed to another device, and combinations thereof.

At 684, the method 680 includes determining a perceived interest of the image, wherein the perceived interest is determined based in part on a period of time the image is visible on the user interface. The method can include selecting the image from an initial viewing location responsive to the assigned perceived interest. In this example, the initial viewing location can be a default viewing location where all images generated by the computing device are stored. A user can scroll through the images and make selections, edits, or otherwise view the images from the initial viewing location. A user configure the computing device with a threshold period of time an image could be viewable on the display to be assigned a perceived interest that corresponds to a desired preference by the user. The controller can apply the configuration to the images as the user is operating the computing device and select images based on the assigned perceived interest without user input.

At 686, the method 680 includes writing, to memory coupled to the user interface, metadata associated with the data for the image based at least in part on the perceived interest and grouping the plurality of images based on the perceived interest. The method can include transferring the image to a different viewing location, wherein the initial viewing location and the different viewing location are visible on the display. For example, the different viewing location can be a viewing location where images that have a perceived interest corresponding to a desired preference. A user can be prompted by the controller periodically as images are added such that a user can make changes or alter preferences (e.g., alter the threshold period of time or quantity of search events). Methods can include reading the metadata from the memory, displaying the image at a location on the user interface based at least in part on a value of the metadata, writing the data for the image to a different address of the memory or an external storage device based at least on a value of the metadata, and/or modifying the data for the image based at least in part on a value of the metadata.

Figure 7:
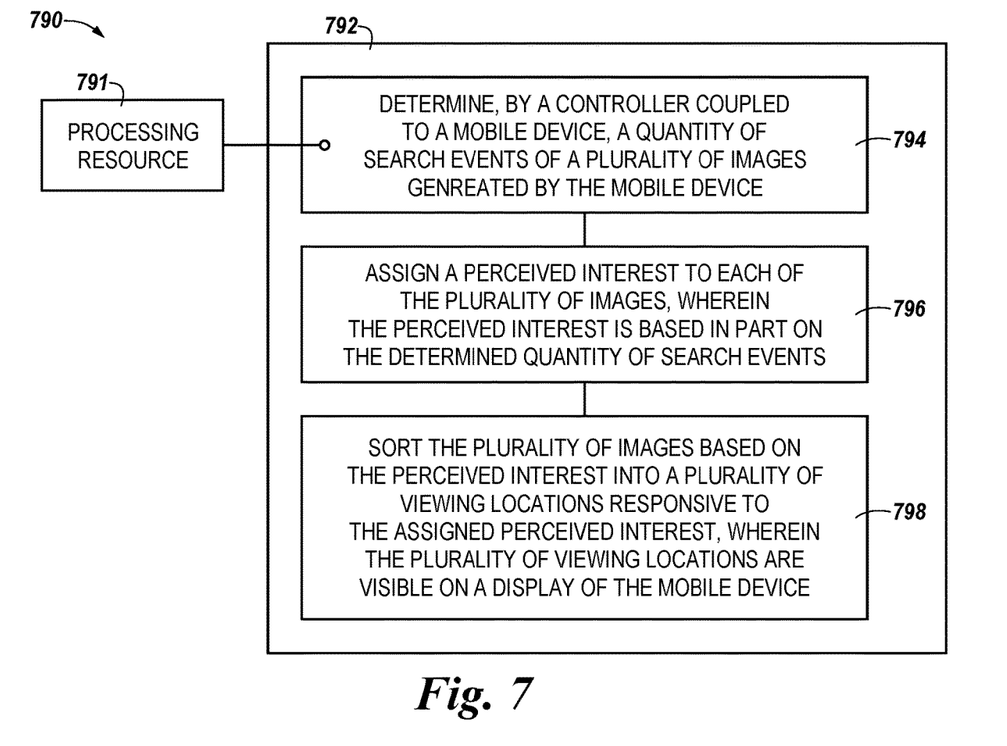
FIG. 7 is a functional diagram representing a processing resource in communication with a memory resource having instructions written thereon for image location based on perceived interest in accordance with a number of embodiments of the present disclosure.

In another non-limiting example, the controller can transfer the image from an initial viewing location to a different viewing location designated for images that are assigned a perceived interest that corresponds to an undesired preference by the user. For example, if an image is not selected, seldom paused over while browsing, etc. the image is likely not important to the user. The controller can assign a perceived interest that corresponds to an undesired preference for the image. In such an example, a user can be periodically prompted to delete the images stored in this viewing location, and/or the user can configure the images to automatically be discarded after a period of time. A number of embodiments can include determining the perceived interest based in part on a period of time the image is visible on the user interface and/or based in part on the image being visible on the user interface prior to a different image being visible on the user interface and subsequently returning to the image being visible on the user interface FIG. 7 is a functional diagram representing a processing resource 791 in communication with a memory resource 792 having instructions 794, 796, 798 written thereon for image location based on perceived interest in accordance with a number of embodiments of the present disclosure. The memory device 792, in some embodiments, can be analogous to the memory device 106 described with respect to FIG. 1. The processing resource 791, in some examples, can be analogous to the controller 108 describe with respect to FIG. 1.

A system 790 can be a server or a computing device (among others) and can include the processing resource 791. The system 790 can further include the memory resource 792 (e.g., a non-transitory MRM), on which may be stored instructions, such as instructions 794, 796, and 798. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 792 may be electronic, magnetic, optical, or other physical storage device that stores executable instructions. Thus, the memory resource 792 may be, for example, a non-transitory MRM comprising Random Access Memory (RAM), an Electrically-Erasable Programmable ROM (EEPROM), a storage drive, an optical disc, and the like. The memory resource 792 may be disposed within a controller and/or computing device. In this example, the executable instructions 794, 796, and 798 can be "installed" on the device. Additionally, and/or alternatively, the memory resource 792 can be a portable, external or remote storage medium, for example, that allows the system 790 to download the instructions 794, 796, and 798 from the portable/external/remote storage medium. In this situation, the executable instructions may be part of an "installation package". As described herein, the memory resource 792 can be encoded with executable instructions for image location based on perceived interest.

The instructions 794, when executed by a processing resource such as the processing resource 791, can include instructions to determine, by a controller coupled to a mobile device, a quantity of search events of a plurality of images generated by the mobile device. In some examples the search events can include voice activated searching, keyword searching, scrolling through images and stopping for a period of time over a particular image, and/or within a period of time, a particular image being visible two or more times where at least one different image is visible between the two or more times.

The instructions 796, when executed by a processing resource such as the processing resource 791, can include instructions to assign a perceived interest to each of the plurality of images, wherein the perceived interest is based in part on the determined quantity of search events. The controller can be configurable to include a threshold quantity of search events required to assign a perceived interest corresponding to a desired image. To avoid error and to gauge subjective interest of a user, an example threshold may be a requirement that an image needs to experience 3 or more search events for the controller to assign a perceived interest corresponding to a desired preference for an image. Such an example may prevent a user from unintentionally indicating that an image is desired when a selection of an image is inadvertent.

The instructions 798, when executed by a processing resource such as the processing resource 791, can include instructions to sort the plurality of images based on the perceived interest into a plurality of viewing locations responsive to the assigned perceived interest, wherein the plurality of viewing locations are visible on a display of the mobile device. The controller can sort the plurality of images based on the assigned perceived interest. This can be done without user input (e.g., upon setting up the computing device the controller can be configured with user preferences) or a user may select a prompt asking if this is a preference. For instance, upon loading the application, the controller can determine that the user may want to include a perceived interest in particular images and may prompt the user for affirmation. Alternatively, the controller can determine that the user may want to include a perceived lack of interest in images that have not been selected for a particular period of time and may prompt the user to discard the images.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
identifying data for an image of a plurality of images displayed via a user interface;
determining a perceived interest of the image, wherein the perceived interest is determined based in part on a period of time the image is visible at a first viewing location on the user interface while using a first application and based in part on a second application being initiated during the period of time the image is visible on the user interface;
writing, to memory coupled to the user interface, metadata associated with the data for the image based at least in part on the perceived interest; and
grouping the plurality of images based on the perceived interest; and
displaying the image at a second viewing location on the user interface based on the perceived interest of the image, wherein the second viewing location represents that the image is desirable and wherein the image is visible at the second viewing location on the user interface while using the first application.

2. The method of claim 1, further comprising:
reading the metadata from the memory; and
displaying the image at the second location on the user interface based at least in part on a value of the metadata.

3. The method of claim 1, further comprising:
reading the metadata from the memory;
writing the data for the image to a different address of the memory or an external storage device based at least on a value of the metadata.

4. The method of claim 1, further comprising:
reading the metadata from the memory; and
modifying the data for the image based at least in part on a value of the metadata.

5. The method of claim 1, further comprising:
determining perceived interests for each of the plurality of images; and
sorting the plurality of images based on the determined perceived interest.

6. The method of claim 5, further comprising transferring a subset of images with perceived interests corresponding to a desired preference to a different viewing location on the user interface, wherein the subset of images are identified responsive to sorting the plurality of images based on the determined perceived interest of each of the plurality of images.

7. The method of claim 5, further comprising transferring a subset of images with perceived interests corresponding to an undesired preference to a different viewing location on the user interface, wherein the subset of images are identified responsive to sorting the plurality of images based on the determined perceived interest of each of the plurality of images.

8. The method of claim 1, further comprising determining the perceived interest based in part on whether the image has been texted or emailed to another device.

9. The method of claim 1, wherein the perceived interest is determined based in part on, within the period of time: the image being visible on the user interface prior to a different image being visible on the user interface; and subsequently returning to the image being visible on the user interface.

10. A non-transitory machine-readable medium comprising instructions executable to:
determine, by a controller coupled to a mobile device, a quantity of search events of a plurality of images generated by the mobile device;
assign a perceived interest to each of the plurality of images, wherein the perceived interest is based in part on the determined quantity of search events while viewing the plurality of images using a first application and based in part on a second application being initiated during the quantity of search events; and
sort the plurality of images based on the perceived interest into a plurality of viewing locations responsive to the assigned perceived interest, wherein the plurality of viewing locations are visible on a display of the mobile device, wherein a first viewing location of the plurality of viewing locations indicates images are desirable, wherein a second viewing location of the plurality of viewing locations images are undesirable and wherein images are visible on the display at the first viewing location and at the second viewing location while using the first application.

11. The medium of claim 10, wherein a search event includes an image of the plurality of images being visible on the display for a period of time prior to progressing to another image.

12. The medium of claim 10, further comprising the instructions executable to:
edit a particular image of the plurality of images; and
change the perceived interest of the particular image, wherein the perceived interest is based in part on the edit made to the particular image.

13. The medium of claim 10, wherein the plurality of images are stored in an initial viewing location in chronological order and a search event includes reverting from a subsequent image to a particular image of the plurality of images within a period of time while viewing the plurality of images in the initial viewing locations.

14. The medium of claim 10, wherein a search event includes, within a period of time, a particular image being visible two or more times, wherein at least one different image is visible between the two or more times.

15. An apparatus, comprising:
a memory device coupled to a display;
a controller coupled to the memory device, wherein the controller is configured to:
determine a first period of time and a second period of time where an image of a plurality of images is visible on the display while using a first application, wherein the first period of time and the second period of time are separated by a third period of time where the image is not visible on the display while using a second application;
assign a perceived interest to the image based on the determined first period of time and second period of time; and
transfer the image from an initial viewing location on the display to a different viewing location on the display responsive to the assigned perceived interest, wherein the different viewing location represents that the image is desirable and wherein the image is visible at the different viewing location on the display while using the first application.

16. The apparatus of claim 15, wherein the display is a portion of a computing device.

17. The apparatus of claim 15, wherein the controller is further configured to:
edit the image by selecting the image from the different viewing location;
assign a new perceived interest to the image based on the edit made to the image; and
transfer the image from the different viewing location to a new viewing location.

18. The apparatus of claim 15, further comprising a plurality of memory media types coupled to the memory device, wherein images included in the initial viewing location are stored in a first memory media type and images included in the different viewing location are stored in a second memory media type.

19. The apparatus of claim 18, wherein the different viewing location on the display includes other images that have been selected based on a respective perceived interest.

20. The apparatus of claim 15, wherein the different viewing location is presented on the display as a first folder indicating the perceived interest.

21. The apparatus of claim 20, wherein the first folder is a suggested collection of desirable images of the plurality of images and a second folder is a suggested collection of images of the plurality of images to be discarded.

* * * * *